United States Patent [19]

Sakamoto et al.

[11] Patent Number: 4,683,480
[45] Date of Patent: Jul. 28, 1987

[54] X-Y PLOTTER DRIVE ROLLER ARRANGEMENT

[75] Inventors: Masami Sakamoto; Ryoichi Nagumo; Tamio Ishihara, all of Katsuta, Japan

[73] Assignee: Hitachi, Ltd., Tokyo, Japan

[21] Appl. No.: 752,854

[22] Filed: Jul. 8, 1985

[30] Foreign Application Priority Data

Jul. 6, 1984 [JP] Japan ................................. 59-139058

[51] Int. Cl.$^4$ ..................... G01D 15/16; B65H 17/38; B41J 11/00
[52] U.S. Cl. ...................................... 346/134; 346/68; 346/129; 346/136; 346/139 R; 226/181; 226/188; 226/191; 226/183; 400/18; 400/617; 400/636; 400/639
[58] Field of Search ................... 346/129, 134, 139 A, 346/68, 136, 139 R; 400/662, 18, 617, 636, 639; 226/187, 181, 188, 191, 183

[56] References Cited

U.S. PATENT DOCUMENTS

| Re. 31,684 | 9/1984 | Yeiser | 346/68 |
| 636,941 | 11/1899 | Barron | 400/662 |
| 1,185,260 | 5/1916 | Stine | 226/187 |
| 1,490,323 | 4/1924 | Hummel, Jr. | 400/662 |
| 4,384,298 | 5/1983 | LaBarre et al. | 346/129 |
| 4,527,174 | 7/1985 | Fujiwara et al. | 346/136 |
| 4,553,951 | 11/1985 | Pavone | 474/148 X |

Primary Examiner—Clifford C. Shaw
Assistant Examiner—Gerald E. Preston
Attorney, Agent, or Firm—Antonelli, Terry & Wands

[57] ABSTRACT

An X-Y plotter disclosed is of the type which moves a recording paper with no perforation by drive rollers and pinch rollers. A plurality of sharp projections are arranged on the outer surface of each of the drive rollers such as to enable an exact feeding of the paper without any slippage. These projections are formed by cutting in the outer surface of each drive roller with V-grooves parallel and orthogonal to the shaft of the drive rollers.

7 Claims, 2 Drawing Figures

X-Y PLOTTER DRIVE ROLLER ARRANGEMENT

BACKGROUND OF THE INVENTION

This invention relates to an X - Y plotter, and more particularly to an X - Y plotter of the type which moves a recording paper without perforations in recording.

An example of an X - Y plotter of this type is disclosed in, for example, U.S. Pat. No. Re. 31,684. This kind of X - Y plotter is advantageous in that perforations are unnecessary to be formed in the recording paper, that a simple drive mechanism for moving paper with a small mass enables high-speed recording, that the plotter is small-sized, and so forth.

One of the most important technical problems in this plotter having various advantages is its paper feed mechanism. That is, since no perforations are provided in the recording paper, it is necessary to give a careful consideration for exactly moving the paper without slipping when the feeding of the same.

The plotter disclosed in U.S. Pat. No. Re. 31,684 moves a recording paper by virtue of the friction force between drive rollers each having a knurled surface and pinch rollers. These knurls formed by knurling are, however, comparatively smooth and it is difficult to form projections having sharp tops by the knurling.

Therefore slippage sometimes occurs between the recording paper and the drive rollers, thereby impeding exact feeding.

SUMMARY OF THE INVENTION

Accordingly it is an object of the invention to provide an X - Y plotter which scarcely causes slippage of a recording paper and which enables exact feeding of the recording paper without perforations.

In order to move the recording paper without slipping, it is necessary to form projections on the outer surface of a drive roller, which are sharp enough to pierce the recording paper. Also, in order to feed the recording paper at an exact rate, it is also necessary to form the sharp tops of the projections of the drive roller such that they are situated in the same circumferential plane. This is because, in case that the sharp tops of the projections are not situated in the same circumferential plane, even if there is no slippage between the recording paper and the drive roller, the amount of the recording paper fed is different in spite of a constant rotation angle of the drive roller.

To satisfy these conditions, in this invention, a plurality of V grooves are formed by cutting in the outer surface of a drive roller both in its axial direction and in the circumferential direction orthogonal thereto such as to form projections in the shape of a substantially quadrangular pyramid. By virtue of the cutting process, it is possible to form projections having sharp tops situated in the same circumferential plane, whereby slippage is prevented at the time of moving the recording paper to feed the same at an exact rate.

The above-described structure can achieve the intended aim, and a further favorable result is obtained by slightly inclining the V grooves which are to be formed in the circumferential direction orthogonal to the axis of the drive roller such as to form a spiral groove, in other words projections arranged in the form of a thread.

As described above, the projections formed on the drive roller are sharp enough to pierce the recording paper, and naturally therefore the projections slightly bite a pinch roller. The trails of the projections of the drive roller keep in a plurality of certain circumferential lines on the pinch roller. That is, in case that the projections formed in the circumferential direction orthogonal to the axis have no inclination, all the projections aligned in one circumferential direction on the drive roller define the same locus when the drive roller is rotated.

As a result, the projections of the drive roller come into contact only with the same circumferential portion of the pinch roller. A continuous use of the plotter therefore leads to a large deformation of the contact portion alone, which fact makes the pinch roller unsuitable for long use.

On the other hand, forming the V grooves with a slight inclination which are to be formed in the circumferential direction orthogonal to the drive roller, namely forming the spiral groove, causes the projections to be arranged in the form of a thread. Accordingly, the projections evenly come into contact with the entire surface of the pinch roller, thus enabling long use of the pinch roller.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
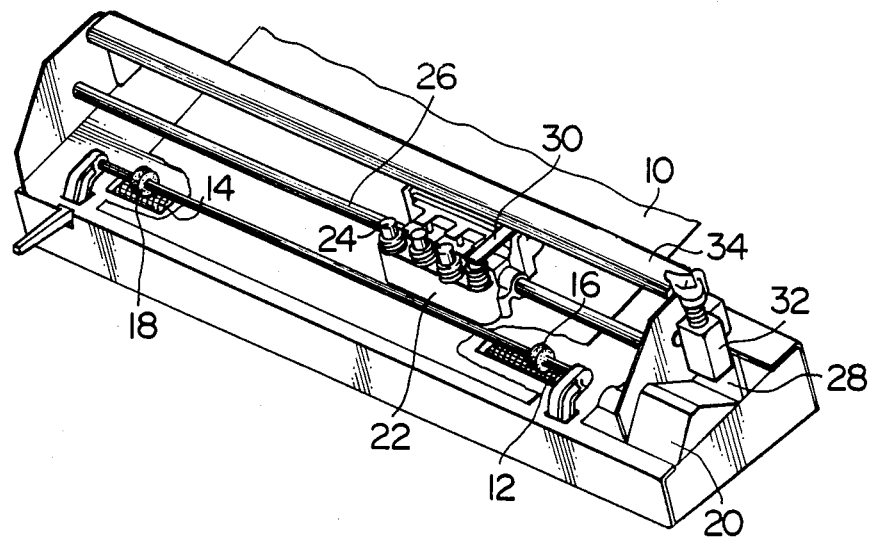
FIG. 1 is a schematic view of an X - Y plotter according to the invention.

FIG. 1 is a schematic view of an X - Y plotter according to the invention.

A recording paper 10 is clamped by brass drive rollers 12, 14 and pinch rollers 16, 18 on the left and right sides. The two drive rollers 12, 14 are connected to a paper feed motor 20 such as to be driven by the motor to move the recording paper 10 forward or backward (in the direction Y). Sharp and regular micro projections are formed on the outer surface of the drive rollers 12, 14. The pinch rollers 16, 18 are formed of hard rubber with a hardness of about 90% and are pressed against the drive rollers 12, 14 with an appropriate force by a spring (not shown). The micro projections therefore bite the recording paper 10 microscopically and feed the paper with the impressions they form remaining. Thus, slippage of the paper which would be caused by a friction type paper feeding method is prevented.

A plurality of recording pens 24 are movably supported on a pen carriage 22 through springs such as not to usually contact with the recording paper. The pen carriage 22 is adapted to be moved laterally (in the direction X) along a shaft 26 as a guide by means of a pen drive motor 28 and a string (not shown). A pen to be used for recording is selected among the recording pens 24 by locating a selector 30 along a lever 34 above the pen which is to be selected. When a solenoid 32 is excited in this state, the lever 34 connected to the solenoid is rotated and the selected recording pen 24 is pressed downward through the selector 30 such as to come into contact with the recording paper 10 for recording. When the excitation of the solenoid 32 is released, the recording pen 24 is restored by the spring force to its original state in which it is out of contact with the recording paper.

Figure 2:
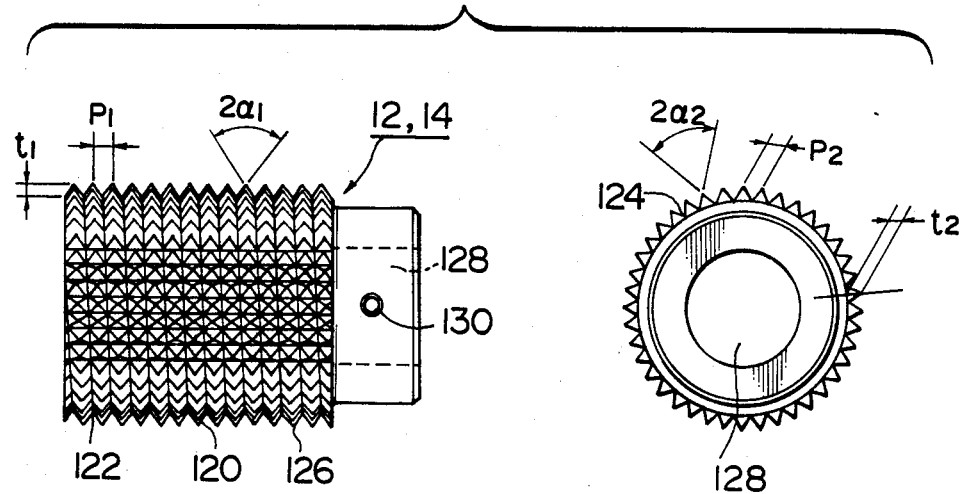
FIG. 2 is a detailed view of a drive roller used in the plotter of FIG. 1.

FIG. 2 shows the detail of the drive roller. In the outer peripheral surface 120 of each of the drive rollers 12, 14, a V-groove 122 is cut in the form of a single spiral of circumferentially equal pitches. Other V-grooves 124 are cut in parallel to each other at equal pitches on the entire periphery in the axial direction substantially orthogonal to the V-groove 122. Accordingly, projections 126 in the shape of a substantially quadrangular pyramid are formed in the outer peripheral surface 120 of each of the drive rollers 12, 14. The substantially quadrangular pyramid has planar side surfaces and a cut line at the adjoining planar side surfaces which cut line extends in a direction other than the feed direction of the recording paper. The pitch $P_1$ of the circumferential V-groove 122 is determined so as to be substantially equivalent to $2t_1 \cdot \tan \alpha_1$, and the pitch $P_2$ of the axial V-grooves 124 to be substantially equivalent to $2t_2 \cdot \tan \alpha_2$. This selection of the dimension of $P = 2t \cdot \tan \alpha$ gives each micro projection a very sharp quadrangular pyramidal form. In this case, $t_1$ represents the depth of the circumferential V-groove 122, $2\alpha_1$ the vertical angle of the circumferential groove, $t_2$ the depth of the axial V-grooves 124, and $2\alpha_2$ the vertical angle of the axial groove. Each of the drive rollers 12, 14 is provided with a hole 128 for receiving a drive shaft for connecting it to the paper feed motor 20, and a threaded bore 130 for fixing the drive roller to the drive shaft.

The circumferential V-groove 122 is formed in the shape of a spiral, and hence the projections 126 are arranged in the form of a thread. The projections 126 of the drive rollers 12, 14 approximately evenly come into contact with the surface of the pinch rollers 16, 18, respectively, which prevents local deformation of the pinch rollers 16, 18 and enables their long use. The circumferential spiral V-groove is easy to machine, and if the V-groove is cut into multiple spirals, more remarkable advantages are obtained.

The drive rollers 12, 14 are formed of brass having good machinability having only few burrs generated in machining, which is favorable for the formation of sharp micro projections.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An X-Y plotter comprising:
   a recording paper;
   at least one recording element for recording on said recording paper;
   first drive means for moving said recording element in a direction X;
   at least one set of a drive roller means and a pinch roller means disposed for clamping said recording paper therebetween; and
   second drive means for rotating said drive roller means to said recording paper in a direction Y which is orthogonal to the moving direction of said recording element;
   said rive roller means having a plurality of projections for engaging and piercing said recording paper to insure exact feeding of said recording paper without slippage thereof, said plurality of projections being formed by a plurality of V-grooves cut in an outer surface of said drive roller means both in the axial direction of said drive roller means and in the circumferential direction substantially orthogonal to said axial direction, each of said projections having the shape of a substantially quadrangular pyramid with a sharp point for enabling piercing of the recording paper.

2. An X-Y plotter according to claim 1, wherein the substantially quadrangular pyramid has planar side surfaces and a cut line at adjoining planar side surfaces, the cut line extending in a direction other than the direction of feeding of the recording paper.

3. An X - Y plotter according to claim 1, wherein said drive roller means is made of brass.

4. An X - Y plotter according to claim 1, wherein a pitch P of said V-grooves in the axial and circumferential directions is determined to approximately meet a condition of $P = 2t \cdot \tan \alpha$, wherein t represents the depth of said V-grooves in the axial and circumferential directions, and $2\alpha$ the vertical angle of said groove.

5. An X - Y plotter according to claim 1, wherein said pinch roller means is made of hard rubber.

6. An X-Y plotter comprising:
   a recording paper;
   at least one recording element for recording on said recording paper;
   first drive means for moving said recording element in a direction X;
   at least one set of a drive roller means and a pinch roller means disposed for clamping said recording paper therebetween; and
   second drive means for rotating said drive roller means to said recording paper in a direction Y which is orthogonal to the moving direction of said recording element;
   said drive roller means having a plurality of projections for engaging and piercing said recording paper to insure exact feeding of said recording paper without slippage thereof, said plurality of projections being formed by a plurality of V-grooves cut in an outer surface of said drive roller means both in the axial direction of said drive roller means and in the circumferential direction substantially orthogonal to said axial direction, each of said projections having the shape of a substantially quadrangular pyramid with a sharp point for enabling piercing of the recording paper, said V-grooves formed in said circumferential direction being machined in the form of a spiral, whereby said projections are arranged in the form of a thread.

7. An X - Y plotter according to claim 6, wherein said projections are arranged in the form of multiple threads.

* * * * *